(12) United States Patent
Miyazawa

(10) Patent No.: US 7,956,883 B2
(45) Date of Patent: Jun. 7, 2011

(54) LIGHT-EMITTING DEVICE, DRIVING CIRCUIT, DRIVING METHOD, AND ELECTRONIC APPARATUS

(75) Inventor: Takao Miyazawa, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 1308 days.

(21) Appl. No.: 11/470,723

(22) Filed: Sep. 7, 2006

(65) Prior Publication Data
US 2007/0097040 A1 May 3, 2007

(30) Foreign Application Priority Data

Nov. 1, 2005 (JP) .................................. 2005-318023

(51) Int. Cl.
B41J 2/45 (2006.01)
B41J 2/435 (2006.01)
(52) U.S. Cl. .................... 347/238; 347/236; 347/246
(58) Field of Classification Search .................... 345/77; 347/236, 238, 253, 246
See application file for complete search history.

(56) References Cited

U.S. PATENT DOCUMENTS

| | | | | | |
|---|---|---|---|---|---|
| 5,671,003 | A | * | 9/1997 | Herczeg et al. | 347/251 |
| 6,339,441 | B2 | * | 1/2002 | Suzuki | 347/133 |
| 2005/0110720 | A1 | * | 5/2005 | Akimoto et al. | 345/76 |
| 2005/0116921 | A1 | * | 6/2005 | Kim | 345/102 |
| 2005/0146597 | A1 | * | 7/2005 | Seto | 347/246 |

FOREIGN PATENT DOCUMENTS

| | | |
|---|---|---|
| JP | A-02-004547 | 1/1990 |
| JP | A-09-160214 | 6/1997 |
| JP | A-2004-191459 | 7/2004 |
| JP | A 2005-81696 | 3/2005 |
| JP | A 2005-103816 | 4/2005 |
| JP | A 2005-103914 | 4/2005 |

* cited by examiner

*Primary Examiner* — Stephen D Meier
*Assistant Examiner* — Sarah Al-Hashimi
(74) *Attorney, Agent, or Firm* — Oliff & Berridge, PLC

(57) ABSTRACT

A light-emitting device includes: light-emitting elements whose luminous energy is controlled according to a current value and a pulse width of a driving signal; a storage unit that stores first and second coefficients for every light-emitting element; a pulse width determining unit that determines the pulse width of the driving signal supplied to each light-emitting element on the basis of the first coefficient, a current value determining unit that determines a current value of the driving signal supplied to each light-emitting element on the basis of the second coefficient, a driving unit that supplies the driving signal having the current value determined by the current value determining unit within the determined pulse width determined, to the light-emitting element, and a coefficient determining unit that calculates the first coefficient based on target values of a light amount and first peak light amounts of one of the light-emitting elements, and calculates the second coefficient.

6 Claims, 7 Drawing Sheets

LIGHT-EMITTING DEVICE, DRIVING CIRCUIT, DRIVING METHOD, AND ELECTRONIC APPARATUS

BACKGROUND

1. Technical Field

The present invention relates to a technique of controlling a light-emitting device such as an organic light-emitting device (hereinafter, referred to as 'OLED').

2. Related Art

Light-emitting devices for controlling light-emitting elements to desired brightness levels depending on pulse widths or current values of signals (hereinafter, referred to as 'driving signals' provided to the light-emitting elements have been proposed. In such a light-emitting device, a brightness variation caused by errors (deviations) in the characteristics of individual light-emitting elements becomes a problem. Techniques for suppressing such a brightness variation by correcting current values of driving signals depending on real characteristics of light-emitting elements are disclosed in, for example, JP-A-2005-103914 and JP-A-2005-81696. Also, techniques for suppressing such a brightness variation by correcting pulse widths of driving signals depending on the errors in the characteristics of light-emitting elements are disclosed in JP-A-2005-103914 and JP-A-2005-103816.

However, an aspect of variation in the characteristic of each light-emitting element over time (for example, a characteristic degrading speed) varies depending on a correct amount (variation caused by correction) in the pulse width or the current value of the driving signal. Therefore, even though the luminous energies of the individual light-emitting elements is temporarily unified by the correction of the pulse width or the current value as in the techniques exemplified above, the deviation in the characteristics of the individual light-emitting elements increases over time. This point will be described below in detail.

FIG. 8 is a graph showing the relationship between the real light amount (vertical axis) of each light-emitting element when the same grayscale value is designated for two light-emitting elements A and B (having characteristics Fa and Fb, respectively), and accumulated time for which the corresponding light-emitting element has been used. In FIG. 8, it is assumed that the light amount of the light-emitting element A and the light amount of the light-emitting element B are different from each other by '$\Delta P$' at a time point t0 (in an initial stage) due to the error between the characteristics of the light-emitting elements A and B. According to the techniques disclosed in JP-A-2005-03914, JP-A-2005-81696, and JP-A-2005-103816, it is possible to make the light amounts of the light-emitting elements A and B almost equal to each other by, for example, increasing the pulse widths or the current values of the driving signals supplied to the light-emitting elements.

However, the aspect of the variation in the light amount of the light-emitting element B over time is changed from the characteristic Fb to a characteristic Fb1 by the correction of the pulse width or the current value. As understood from the characteristic Fb1, the speed at which the light amount of the light-emitting element B decreases over time (hereinafter, referred to as 'a deteriorating speed') is higher than the deteriorating speed (characteristic Fb) of the light-emitting element B before the correction or the deteriorating speed (characteristic Fa) of the light-emitting element A due to the increase in the pulse width or the current value of the driving signal. Therefore, the difference between the light amounts of the light-emitting elements A and B increases over time as compared to a case in which the driving signal is not corrected. For example, even though the light emission amounts of the light-emitting elements A and B are unified at the time point t0, the difference $\Delta P1$ between the light emission amounts of the light-emitting elements at a time point t1 is larger as compared to the case in which the driving signal is not corrected.

SUMMARY

An advantage of some aspects of the invention is that it provides a technique for preventing a variation in the brightness (grayscale value) of a light-emitting element for a long time.

A light-emitting device according to a first aspect of the invention includes: a plurality of light-emitting elements whose luminous energy is controlled according to a current value and a pulse width of a driving signal; a storage unit (for example, a storage unit 26 shown in FIG. 1) that stores first coefficients (for example, correction coefficients Ka[j] shown in FIG. 1) and second coefficients (for example, correction coefficients Kb[j] shown in FIG. 1) for every light-emitting element; a pulse width determining unit (for example, a pulse width determining unit 35 shown in FIG. 1) that determines the pulse width of the driving signal supplied to each light-emitting element on the basis of the first coefficient for the corresponding light-emitting element stored in the storage unit and a grayscale value designated for the corresponding light-emitting element by grayscale data; a current value determining unit (for example, a current value determining unit 37 shown in FIG. 1) that determines a current value of the driving signal supplied to each light-emitting element on the basis of the second coefficient for the corresponding light-emitting element stored in the storage unit; and a driving unit (for example, a driving circuit 24 shown in FIG. 1) that supplies the driving signal having the current value determined by the current value determining unit within the pulse width determined by the pulse width determining unit to the corresponding light-emitting element. In the light-emitting device, a variation in the light emission characteristic of each light-emitting element when the pulse width is changed and the current value of the driving signal is fixed is different from a variation in the light emission characteristic thereof when the current value is changed and the pulse width of the driving signal is fixed. Further, the first and second coefficients stored in the storage unit are selected so that the peak light amount of the individual light-emitting elements when the same grayscale value is designated by the grayscale data are almost equal to one another and variations in the light emission characteristics of the plurality of light-emitting elements driven by the driving signals from the driving unit are substantially equal to one another.

With this construction, since the first and second coefficients are selected so that the peak light amounts (luminous energies) of the light-emitting elements when the same grayscale value is designated by the grayscale data are almost equal to one another, it is possible to suppress the variation in the brightnesses (grayscale values) of the plurality of light-emitting elements. Further, since the first and second coefficients are selected so that the variations in the light emission characteristics of the plurality of light-emitting elements driven by the driving signals from the driving unit are substantially equal to one another, it is possible to suppress the difference between the light-emitting elements from increasing over time. Therefore, an effect of suppressing the variation in the brightnesses (grayscale values) can be maintained for a long time.

In the invention, the light-emitting element is an element for emitting light and more specifically, an element for emitting light by electrical energy. In the invention, the construction and the material of the light-emitting element are arbitrary. For example, an element including a light-emitting layer made of an organic EL material or an inorganic EL material and a pair of electrodes with the light-emitting layer interposed therebetween can be used as the light-emitting element in the invention. Further, various light-emitting elements such as a light-emitting diode (LED) element or an element emitting light by plasma discharge can be used in the invention.

The variation in the light-emitting element in the invention means the relationship between time having elapsed since the light-emitting element was manufactured (or time having elapsed since the light-emitting element started to be used) and the characteristic of the light-emitting element, and typically is a speed at which the characteristic of the light-emitting element varies. For example, preferably, the speed at which the light amount of each light-emitting element degrades over time when a predetermined grayscale value is designated is substantially proportional to the pulse width of the driving signal and simultaneously, to the m-th power (m is a real number) of the current value of the corresponding driving signal. In this aspect, the first and second coefficients are selected so that the speeds at which the light amounts of the plurality of light-emitting elements decrease when the predetermined grayscale value is designated are almost equal. Lifetime, which is time that it takes the characteristic value (for examples the light amount when the predetermined grayscale value is designated) of the light-emitting element to be reduced to a predetermined value, also corresponds to the aspect of the variation in the light emission characteristic of the light-emitting element in the invention. The light emission characteristic of the light-emitting element is, for example, a relative ratio (luminous efficiency) between the current value supplied to the light-emitting element, the spectral characteristic, or the light amount of the light-emitting element when the predetermined grayscale value is designated and the light amount when the current value is supplied to the light-emitting element.

Cases in which the light amounts of the light-emitting elements when the same grayscale value is designated by the grayscale data are 'almost equal' include a case in which the difference between the light amounts is so small as not to be a problem (the light amounts are substantially equal) as well as a case in which the light amounts of the light-emitting elements are exactly equal. For example, when the light-emitting device according to the aspect of the invention is used as an exposing device of an image forming apparatus, it is assumed that the same grayscale value is designated for the plurality of light-emitting elements. Even though one of the plurality of light-emitting elements emits light in a first light amount and simultaneously, another of the plurality of light-emitting elements emits light in a second light amount different from the first light amount, as long as the grayscale levels of an image formed on a sheet by exposing to the first amount of light and the grayscale levels of an image formed on a sheet by exposing to the second amount of light look the same, it can be said that the first light amount and the second light amount are almost equal to each other. Similarly, when the light-emitting device according to the aspect of the invention is used as a display device, even though a light-emitting element with a first light amount and another light-emitting element with a second light amount exist, as long as the grayscale levels of images displayed by light emitted by the light-emitting elements look the same, it can be said that the first light amount and the second light amount are almost equal.

Further, cases in which aspects of the variation in the light emission characteristic of each light-emitting element are 'almost equal' include a case in which the aspects are substantially same as well as a case in which the variations in the light emission characteristics of the light-emitting elements are exactly equal to each other. In other words, the first and second coefficients are determined so that a condition in which the variation in the light emission characteristic of each light-emitting element (for example, Equation 3 in an embodiment to be described below) is satisfied. Therefore, even though the variations in the light emission characteristics of the light-emitting elements are different form each other due to conditions under which the light-emitting element is used, as long as the first and second coefficients are selected so that the variations in the light emission characteristics of the light-emitting elements are almost equal to each other in an initial stage, it can be said that the variations in the light emission characteristics of the light-emitting elements are almost equal to each other.

In the light-emitting device according to the first aspect of the invention, the pulse width determining unit may determine the pulse width of the driving signal by multiplying the grayscale value designated by the grayscale data by the first coefficient stored in the storage unit. In this construction, since the pulse width is determined by multiplying the grayscale value by the first coefficient, the construction of the pulse width determining unit can be simplified. Further, in the light-emitting device according to the first aspect of the invention, when the driving signal having the current value determined such that the light amount of any light-emitting element becomes a target value P0 is supplied and one light-emitting element emits light in a peak light amount Pa, the first coefficient Ka for the one light-emitting element stored in the storage unit may satisfy the following:

$$Ka=(P0/Pa)^{m/(m-1)}$$

(where m is a real number)

Furthermore, in the light-emitting device according to the first aspect of the invention, when the driving signal having the current value and the pulse width determined such that the peak light amount of any light-emitting element becomes a target value P0 is supplied and one light-emitting element emits light in a peak light amount Pa, the current value determining unit may determine the current value of the driving signal supplied to the one light-emitting element on the basis of the first coefficient so that a peak light amount Pb of the one light-emitting element satisfies the following:

$$Pb=P0\times(P0/Pa)^{-m/(m-1)}$$

(where m is a real number).

An electronic apparatus according to a second aspect of the invention includes the light-emitting element according to first aspect of the invention. A typical example of the electronic apparatus is an image forming apparatus using the light-emitting device according to the first aspect of the invention as an exposing device (exposing head). The image forming apparatus includes an image carrier with an image forming surface where a latent image is formed by exposing, the light-emitting device according to the first aspect of the invention exposing the image forming surface, and a developing device forming a toner image by depositing a developer (for example, toner) to the latent image. With the light-emitting device according to the first aspect of the invention, since an effect of suppressing the variation in the light amount (grayscale value) of each light-emitting element is maintained for a long time. Therefore, an image forming apparatus using the light-emitting device can form images with a uniform quality on recording materials for a long time.

However, the usage of the light-emitting device according to the first aspect of the invention is not limited to exposing. For example, the light-emitting device according Lo the first aspect of the invention can be used as a display device in various electronic apparatuses. Various electronic apparatuses include, for example, a personal computer and a cellular phone. The light-emitting device according to the first aspect of the invention can be used as an illuminating device such as a device (backlight) that is disposed on the rear surface side of a liquid crystal device and illuminates the liquid crystal device or a device that is provided in an image reader such as a scanner and illuminates scripts.

According to a third aspect of the invention, a circuit of driving a light-emitting device is provided. The light-emitting device includes a plurality of light-emitting elements whose light emission amount is controlled according to a current value and a pulse width of a driving signal. In each of he light-emitting elements, a variation in the light emission characteristic when the pulse width is changed and the current value of the driving signal is fixed is different from a variation in the light emission characteristic when the current value is changed and the pulse width of the driving signal is fixed. The driving circuit includes: a storage unit that stores first and second coefficients for every light-emitting element; a pulse width determining unit that determines the pulse width of the driving signal supplied to each light-emitting element on the basis of the first coefficient for the corresponding light-emitting element stored in the storage unit and a grayscale value designated by grayscale data for the corresponding light-emitting element; a current value determining unit that determines the current value of the driving signal supplied to each light-emitting element on the basis of the second coefficient for the corresponding light-emitting element stored in the storage unit; and a driving unit that supplies the driving signal having the current value determined by the current value determining unit within the pulse width determined by the pulse width determining unit to the corresponding light-emitting element. In the driving circuit, the first and second coefficients stored in the storage unit are selected so that the light amounts of the individual light-emitting elements when the same grayscale value is designated by the grayscale data to the light-emitting elements are almost equal to one another and the variations in the light emission characteristics of the plurality of light-emitting elements driven by the driving signals from the driving unit are substantially equal to each other. The driving circuit makes it possible to suppress the variation in the light amount (grayscale value) of each light-emitting element for a long time.

According to a fourth aspect of the invention, a method of driving a light-emitting device is provided. The light-emitting device includes a plurality of light-emitting elements whose luminous energy is controlled according to a current value and a pulse width of a driving signal. In each of the light-emitting elements, a variation in the light emission characteristic when the pulse width is changed and the current value of the driving signal is fixed is different from a variation in the light emission characteristic when the current value is changed and the pulse width of the driving signal is fixed. The method includes: determining the pulse width of the driving signal supplied to each light-emitting element on the basis of the first coefficient set for the corresponding light-emitting element and a grayscale value designated by grayscale data for the corresponding light-emitting element; determining the current value of the driving signal supplied to each light-emitting element on the basis of the second coefficient set for the corresponding light-emitting element; supplying the driving signal having the current value determined on the basis of the second coefficient within the pulse width determined on the basis of the first coefficient to the corresponding light-emitting element; and setting the first and second coefficients so that the light amounts of the individual light-emitting elements when the same grayscale value is designated by the grayscale data to the light-emitting elements are almost equal to one another and the variations in the light emission characteristics of the plurality of light-emitting elements driven by the driving signals are substantially equal to each other. The driving method has the same effects as the light-emitting device according to the first aspect of the invention.

DESCRIPTION OF EXEMPLARY EMBODIMENTS

Construction of light-emitting device

Figure 1:
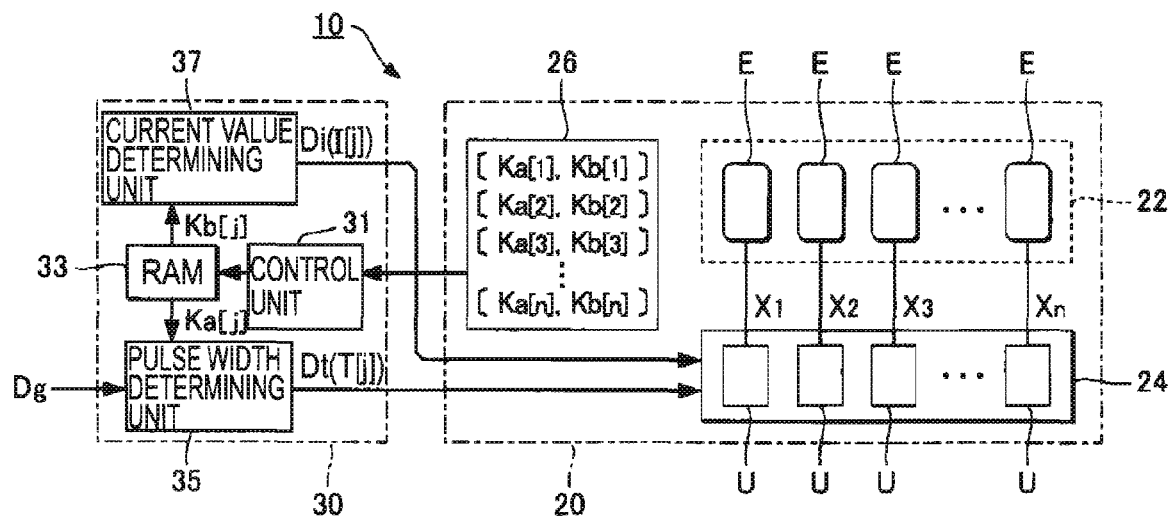
FIG. 1 is a block diagram showing the construction of a light-emitting device according to an embodiment of the invention.

FIG. 1 is a block diagram showing the construction of a light-emitting device according to an embodiment of the invention. A light-emitting device 10 is used as an exposure head for exposing a photosensitive member in an image forming apparatus (a printer) for forming latent images by exposing the photosensitive member. As shown in FIG. 1, the light-emitting device 10 includes a head module 20 that emits light beams corresponding to a desired image toward the surface of a photosensitive member, and a controller 30 for controlling the operation of the head module 20.

The head module 20 includes a light-emitting unit 22, a driving circuit 24, and a storage device 26. The light-emitting unit 22 has n light-emitting elements E linearly arranged therein along a main scanning direction (n is a natural number). The driving circuit 24 drives the light-emitting elements E and includes n unit circuits U corresponding to the light-emitting elements E. The driving circuit 24 may be composed of a plurality of IC chips which are disposed for groups each composed of n light-emitting elements E and each of which includes a predetermined number of unit circuits U. Also, the driving circuit 24 may be composed of one IC chip for controlling all the light-emitting elements E.

Figure 2:
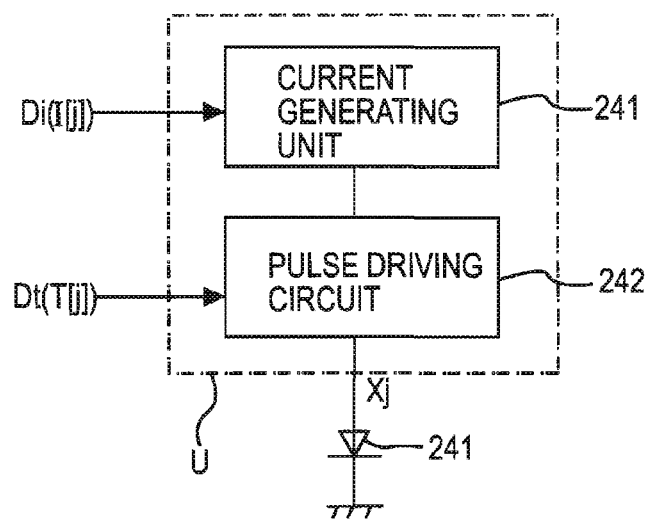
FIG. 2 is a block diagram showing the construction of a unit circuit and a light-emitting element.

FIG. 2 is a block diagram specifically showing the construction of one unit circuit U and a light-emitting element E corresponding thereto. More specifically, FIG. 2 shows only a unit circuit U and a light-emitting element E in a j-th column, but the construction of the other unit circuits U and the other light-emitting elements E are the same as that of FIG. 2. As shown in FIG. 2, the light emitting-element E according to this embodiment is an OLED element that is composed of a positive electrode, a negative electrode, and a light-emitting layer formed of an organic EL material between the positive and negative electrodes.

Figure 3:
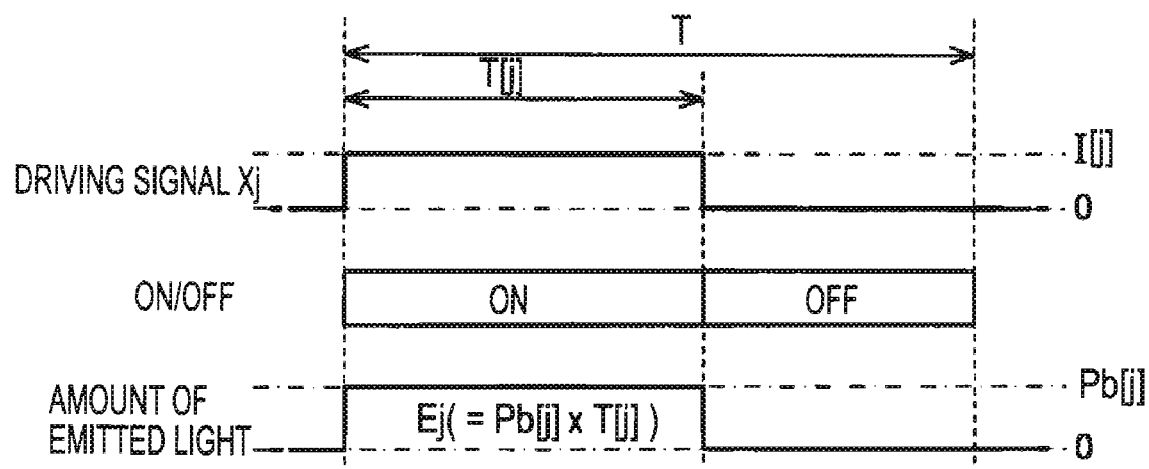
FIG. 3 is a flow chart illustrating the relationship between a driving signal Xj and the operation of the light-emitting element.

The unit circuit U generates a driving signal Xj on the basis of pulse width data Dt and current value data Di supplied from the controller 30 and outputs the driving signal Xj to the light-emitting element E. FIG. 3 is a timing chart showing the waveform of the driving signal Xj output by the unit circuit U. As shown in FIG. 3, the pulse width data Dt defines the time length T[j] of a light emission period (that is, the pulse width of the driving signal Xj) for which the light-emitting element E is actually in an ON state, in a period T (hereinafter, referred to as 'a unit period'), for which the light-emitting element E is controlled. The current value data Di defines the current value I[j] of a current supplied to the light-emitting element E during the light emission period.

As shown in FIG. 2, the unit circuit U includes a current generating circuit 241 and a pulse driving circuit 242. The current generating circuit 241 adjusts the current value of the driving signal Xj in the light emission period to the current value I[j] defined by the current value data Di. For example, a DAC (digital-to-analog converter) generating a current signal of the current value I[j] defined by the current value data Di is used as the current generating circuit 241. Meanwhile, the pulse driving circuit 242 adjusts the pulse width (the time length of the light emission period) of the driving signal Xj to the pulse width T[j] defined by the pulse width data Dt. For example, a switch controlled according to the pulse width data Dt is used as the pulse driving circuit 242. The switch outputs the current signal generated by the current generating circuit 241 to the light-emitting element E within the pulse width T[j] defined by the pulse width data Dt, and stops outputting the current signal in periods other than the pulse width T[j].

As shown in FIG. 3, when the driving signal Xj rises to the current value I[j] in the light emission period having the time length (the pulse width) T[j], the light-emitting element E in the j-th column emits light in a light amount (hereinafter, referred to as 'a peak light amount') Pb[j] that is proportional to the current value T[j]. Meanwhile, when the unit circuit U stops outputting a current (that is, when the current value of the driving signal Xj falls to zero), the light-emitting element E is turned off. Therefore, according to the pulse width T[j] of the driving signal Xj, latent images having various shapes or grayscale levels (or toner images obtained by attaching toner to the latent images) are formed on the surface of the photosensitive member.

Errors (deviations) can be caused in the electrical and optical characteristics of the light-emitting element E by various reasons. In this embodiment, a brightness variation in the light-emitting unit 22 can be prevented by adjusting both the pulse width T[j] and the current value I[j] of the driving signal Xj according to the characteristics of the light-emitting element E. The storage device 26 shown in FIG. 1 stores a pair of correction coefficients Ka[j] and Kb[j] for each light-emitting element E. The correction coefficient Ka[j] is for correcting the pulse width T[j] of the driving signal Xj, and the correction coefficient Kb[j] is for correcting the current value I[j] of the driving signal Xj. For example, a nonvolatile memory, such as an EEPROM (electrically erasable programmable read-Only memory) can be used as the storage device 26.

Next, a procedure of determining the correction coefficients Ka[j] and Kb[j] will be described with reference to FIG. 4. Actually, a computer (for example, a personal computer) determines the correction coefficients Ka[j] and Kb[j] for each light-emitting element E by performing the processes of FIG. 4 according to a program.

Figure 4:
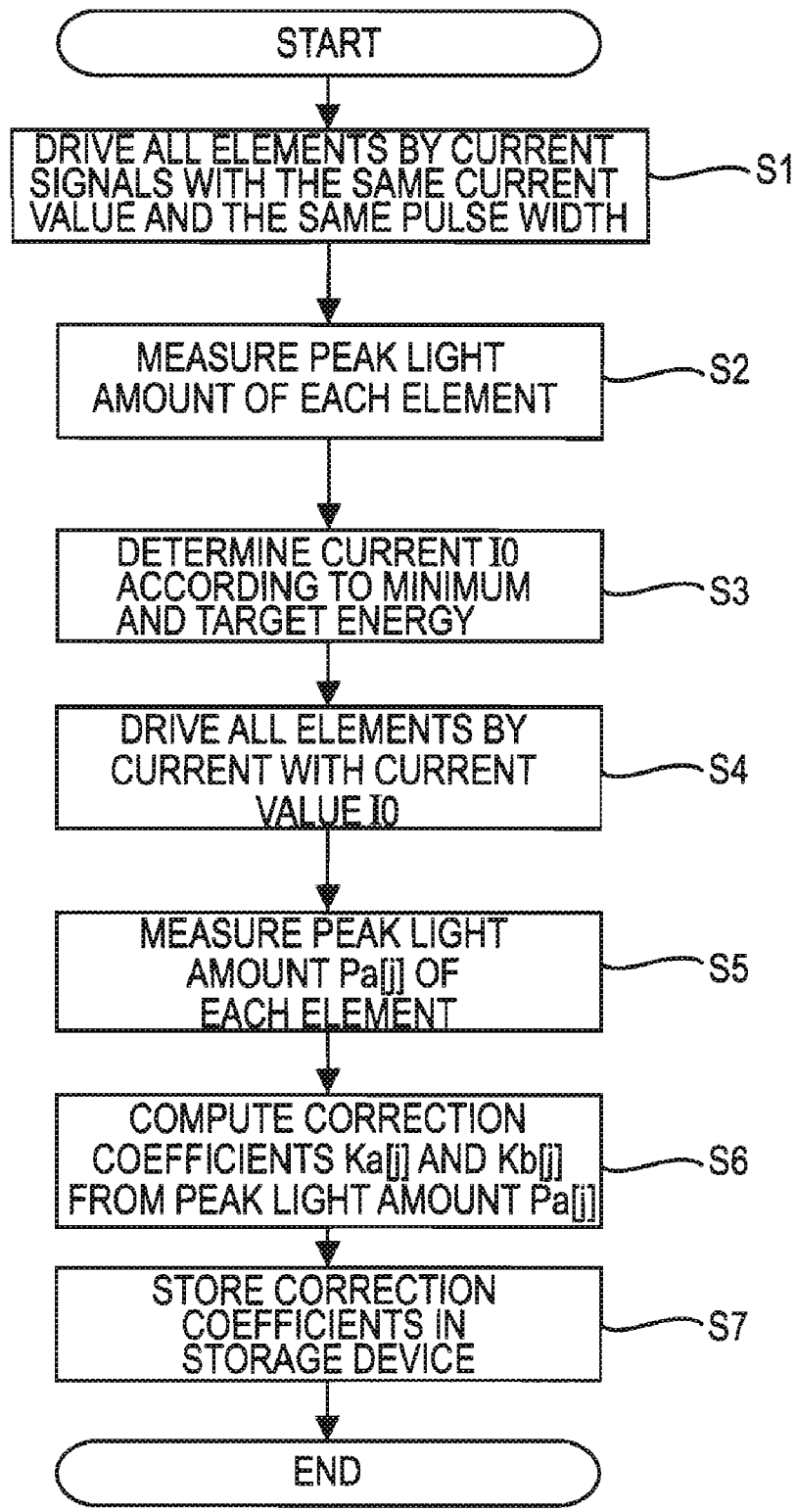
FIG. 4 is a flow chart for explaining the procedure of determining correction coefficients.

As shown in FIG. 4, first, all the light-emitting elements E are driven to emit light by receiving current signals having the same current value and pulse width (Step S1). The electrical and optical characteristics of the light-emitting elements E (in particular, the relationship between the current value and the quality of light) are different from each other. Therefore, when it is said that the current values and the pulse widths of all the light-emitting elements E are equal to each other, the real amounts of light emitted from the light-emitting elements E are different from each other. In Step S2, the peak amount of light emitted from each light-emitting element E in Step S1 is measured. More specifically, the peak light amount of each light-emitting element E is measured on the basis of, for example, an output signal from a light receiving element disposed to be opposite to each light-emitting element E.

Subsequently, a current value I0 is determined on the basis of the minimum value of the n peak light amounts measured in Step S2 (Step S3). More specifically, when the current of the current value I0 is supplied to the light-emitting element E whose peak light amount is the minimum value (that is, a light-emitting element E whose luminous efficiency is lowest), the current value I0 is determined so that the luminous energy of the corresponding light-emitting element E becomes a target value E0 (=P0×T0). As shown in FIG. 3, the luminous energy Ej is defined as a value obtained by multiplying the peak light amount of the light-emitting element E by the time length of the light emission period (Ej=Pb[j]×Tb[j] in the example shown in FIG. 3). In this embodiment, the driving signal Xj is corrected such that the luminous energy of all the light-emitting elements E is reduced to the target value E0, which prevents a variation in grayscale.

The light-emitting element E becoming a standard for the luminous energy is not limited to the light-emitting element E of which the peak light amount is minimum. For example, the current value I0 may be selected such that the luminous energy of the light-emitting element E of which the peak light amount is maximum reaches the target value E0. In this case, the driving signal Xj is corrected such that the luminous energy of each light-emitting element E increases up to the target value E0.

Next, all the light-emitting elements E are driven to emit light by receiving the current of the current value I0 over the time length T0 (Step S4). Subsequently, the peak light amounts Pa[j] (Pa[1] to Pa[n]) of the individual light-emitting elements E at that time are measured by the same method as that in Step S2 (Step S5). On the basis of the result measured in Step 5, the correction coefficients Ka[j] (Ka[1] to Ka[n]) and Kb[j] (Kb[1] to Kb([n]) are computed (Step S6). The correction coefficients Ka[J] and Kb[j] computed for every light-emitting element E according to the above-mentioned procedure are stored in the storage device 26 (Step S7).

Next, a specific method of computing the correction coefficients Ka[j] and Kb[j] from the peak light amounts Pa[j] in Step S6 will be described. In this embodiment, it is supposed that the driving signal Xj of the light-emitting element E having driven to emit light by receiving the current (the current value I0 and the pulse width T0) in Step S4 is corrected such that the peak light amount Ka[j] increases to the peak light amount Pb[j] and the pulse width T0 decreases to the pulse width Tb[j], as shown in FIG. 5.

Now, a variation in the lifetime of the light-emitting element E when the driving signal Xj is corrected will be examined. In this embodiment, the lifetime is a numeral value that indicates a speed at which the characteristics (for example, luminous efficiency) of the light-emitting element E deteriorate. In this embodiment, the lifetime corresponds to a time length from a point of time immediately after manufacturing of the light-emitting element E to a point of time when the peak light amount of the light-emitting element E when a predetermined current is supplied is reduced to a predetermined value (for example, about 80% of the peak light amount in an initial state).

Figure 5:
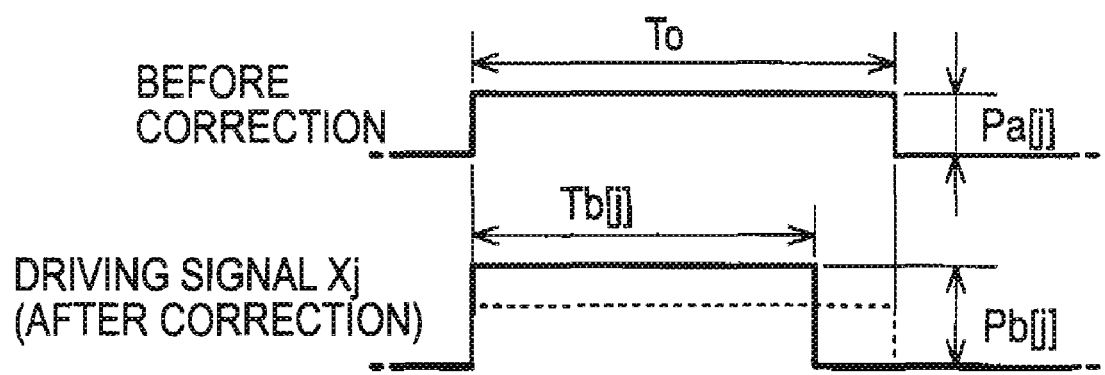
FIG. 5 is a timing chart showing the waveforms of the driving signal Xj before and after correction.

When the peak light amount of the light-emitting element E is changed from Pa[j] to Pb[j] as shown in FIG. 5 by increasing the current value from I0 to Ib[j] while maintaining the pulse width T0 of the driving signal Xj, the lifetime LT1 of the light-emitting element E after the change is expressed by the following Equation 1:

$$LT1 = LT0 \times (Pa[j]/Pb[j])^m \qquad (1).$$

However, 'LT0' in Equation 1 is the lifetime of the light-emitting element E when the current of the current value I0 (the pulse width T0) is continuously supplied for a long time (that is, the lifetime when the driving signal Xj is not corrected). Further, 'm' in Equation 1 is an actual value (typically, a natural number) such as '2' or '3', which is determined according to the material, the construction, or the manufacturing method of the light-emitting element E. As can be understood from Equation 1, the lifetime LT1 is in inverse proportion to the m-th power of the peak light amount Pb[j]. That is, the speed at which the characteristics of the light-emitting element E deteriorate is in proportion to the m-th power of the peak light amount Pb[j].

Subsequently, when the pulse width is changed from T0 to Tb[j] as shown in FIG. 5 while maintaining the current value Ib[j] of the driving signal Xj, the lifetime LT2 of the light-emitting element E after the change is expressed by the following Equation 2:

$$LT2 = LT1 \times (T0/Tb[j]) \qquad (2).$$

As can be understood from Equation 2, the lifetime LT2 is in inverse proportion to the pulse width Tb[j]. In other words, the characteristics of the light-emitting element E deteriorate in proportion to the pulse width Tb[j]. As can be apparently seen from Equations 1 and 2, in this embodiment, the variation in the electrical or optical characteristics of the light-emitting element E (the speed at which the characteristics deteriorate) when the pulse width T[j] is changed while maintaining the current value Ib[j] of the driving signal Xj is different from that when the current value Ib[j] is changed while maintaining the pulse width T[j] of the driving signal Xj.

In order to constantly maintain the lifetime of the light-emitting element E regardless of the correction, the following Equation 3 should be established:

$$LT2 = LT0 \qquad (3).$$

In other words, a condition in which the light time LT0 when the driving signal Xj is not corrected is equal to the lifetime LT2 when the driving signal Xj is corrected is satisfied.

Equation 4 is obtained by substituting Equations 1 and 2 for Equation 3 and deforming the result:

$$(Pa[j]/Pb[j])^m \times (T0/Tb[j]) = 1 \qquad (4).$$

Meanwhile, in order to suppress a brightness variation by unifying the amounts of light emitted from the individual light-emitting elements E of the light-emitting unit 22, it is necessary to make the luminous energy of each light-emitting element E equal to the target value E0. Since the luminous energy of the driving signal Xj after the correction is 'Pb[j]× Tb[j]', in order for the luminous energy of the light-emitting element E in the j-th column to be adjusted to the target value E0, the following Equation 5 should be satisfied:

$$T0 = Pb[j] \times Tb[j] \qquad (5).$$

Equation 5 is deformed to the following Equation 6.

$$Pb[j] = P0 \times T0/Tb[j] \qquad (6).$$

Then, the following Equation 7a is derived by substituting Equation 6 into Equation 4:

$$Tb[j] = T0 \times (P0/Pa[j])^{m/(m-1)} \qquad (7a).$$

Further, the following Equation 7b is derived by substituting Equation 7a into Equation 6:

$$Pb[j] = P0 \times (P0/Pa[j])^{-m/(m-1)} \qquad (7b).$$

As can be understood from the above-mentioned deriving process, the luminous energies of the individual light-emitting elements E can be unified while maintaining the deterioration speed (lifetime) of each light-emitting element E regardless of the correction by supplying the driving signal Xj having the pulse width Tb[j] of Equation 7a and the current value Ib[j] corresponding to the peak light amount Pb[j] of Equation 7b from the unit circuits U to the light-emitting elements E.

In this embodiment, the correction coefficient Ka[j] stored in the storage device 26 is a numeral value computed by the following Equation 8a obtained by deforming Equation 7a:

$$Ka[j] = Tb[j]/T0 = (P0/Pa[j])^{m/(m-1)} \qquad (8a).$$

Further, the correction coefficient Kb[j] stored in the storage device 26 corresponds to the current value Ib[j] that makes the light-emitting element E in the j-th column emit light in the peak light amount of Equation 7b. Since the current value of the current supplied to the light-emitting element E is in proportion to the peak light amount when the current is supplied, a relationship 'Pa[j]=kj×I0' is established between the current value of the current supplied to the light-emitting element E and the peak light amount Pat[j] of the light-emitting element E in the j-th column when the current value I0 is supplied in Step S4. Here, 'kj' is a proportional constant (luminous efficiency) determined according to the characteristics of the light-emitting element E in the j-th column. Similarly, a relationship 'Pb[j]=kj×Ib[j]' is established between the current value Ib[j] and the peak light amount Pb[j]. Therefore, the correction coefficient Kb[j] stored in the storage device 26 is expressed by the following Equation 8b:

$$Kb[j] = Ib[j] = Pb[j]/kj = (P0/kj) \times (P0/Pa[j])^{-m/(m-1)} \qquad (8b).$$

Next, the construction of the controller 30 shown in FIG. 1 will be described. The controller 30 is for generating the pulse width data Dt and the current value data Di on the basis of the correction coefficients Ka[j] and Kb[j] computed according to the above-mentioned procedure and grayscale data Dg designating grayscale values of the individual light-emitting elements E. The grayscale data Dg are sequentially supplied in synchronization with a dot clock from various host devices, such a CPU of an image forming device with the light-emitting device 10. More specifically, n grayscale data Dg of the individual light-emitting elements E from the first column to an n-th individual column are sequentially supplied to the controller 30 in every unit period in that order.

As shown in FIG. 1, the controller 30 includes a control unit 31, a RAM 33, a pulse width determining unit 35, and a current value determining value 37. The control unit 31 is for sequentially reading sets of correction coefficients Ka[j] and Kb[j] from the storage unit 26 in synchronization with the dot clock. The control unit 31 sequentially reads the set of the correction coefficients Ka[1] and Kb[1] corresponding to the first column to the set of the correction coefficients Ka[n] and Kb[n] corresponding to the n-th column in the order in which the light-emitting elements E are arranged. The correction coefficients Ka[j] and Kb[j] read by the control unit 31 are stored in the RAM 33.

The pulse width determining unit 35 is for determining the pulse width T[j] of the driving signal Xj supplied to each light-emitting element E on the basis of the grayscale data Dg of the corresponding light-emitting element E and the correction coefficient Ka[j] for the corresponding light-emitting element E stored in the RAM 33. More specifically, the pulse width determining unit 35 includes a multiplier that multiplies the grayscale value designated by the grayscale data Dg by the correction coefficient Ka[j] stored in the RAM 33, and generates and outputs the pulse width data Dt in which the computed value is designated as the pulse width T[j]. The pulse width determining unit 35 of this embodiment sequentially generates and outputs the pulse width data Dt whenever the grayscale data Dg of the light-emitting elements E are supplied in synchronization with the dot clock.

The current value generating unit 37 is for sequentially determining the current value I[j] of the driving signal Xj supplied to each light-emitting element E on the basis of the correction coefficient Kb[j] for the corresponding light-emitting element E stored in the RAM 33. In this embodiment, since the current value Ib[j] making the light-emitting element E emit light in the peak light amount Pb[j] is stored in the storage device 26 as the correction coefficient Kb[j], the current value generating unit 37 generates and outputs the current value data Di in which the correction coefficient Kb[j] is designated as the current value I[j]. In this embodiment, the current value I[j] does not depend on the grayscale data Dg. Therefore, the current value data Di are generated one time immediately after power is supplied to the light-emitting device 10, and are output to the individual unit circuits U. The unit circuit U continuously generates the current value I[j] corresponding to the supplied current value data Di until the power supply is cut off. The current value I[j] may be designated to one unit circuit U plural times.

In the above-mentioned construction, the unit circuit U in the j-th column generates the driving signal Xj that has the current value I[j] of the current value data Di within the pulse width T[j] designated by the pulse width data Dt and outputs the generated driving signal Xj to the light-emitting element E in the j-th column. Therefore, the light-emitting element E emits light in the peak light amount that depends on the correction coefficient Ka[j] and the grayscale data Dg for the unit period and depends on the correction coefficient Kb[j] for the light emission period of the time length (pulse width T[j]), but does not emit light for the other periods.

As described above, in this embodiment, the luminous energies of the light-emitting elements E are unified to the target value E0 by correcting the current value I[j] and the pulse width T[j] of the driving signal Xj, which makes it possible to prevent a brightness variation in the light-emitting unit 22. Therefore, it is possible to form a latent image with a uniform quality on the surface of the photosensitive member with high accuracy.

Further, in this embodiment, the correction coefficients Ka[j] and Kb[j] are selected so that the lifetimes (characteristic degrading speed) of a plurality of light-emitting elements E driven by the corrected driving signal Xj are almost equal to one another, which makes it possible to prevent the difference in the characteristics among the light-emitting elements E from increasing over time. Therefore, it is possible to maintain the effect of accurately forming a latent image with a uniform quality for a long time.

MODIFICATIONS

The above-mentioned embodiment can be variously modified. Specific modifications can be exemplified as follows. The modifications can be appropriately combined.

First Modification

In the above-mentioned embodiment, the storage device 26 for storing the correction coefficients Ka[j] and Kb[j] is provided in the head module 20. However, the position where the storage device 26 is provided may be appropriately changed. For example, the storage device 26 may be built in the controller 30. The correction coefficient Ka[j] or Kb[j] is a numeral value depending on the characteristics of each light-emitting element E. Therefore, when producing the light-emitting device 10 including the controllers 30 with the built-in storage device 26 in large quantities, it is required to strictly manage the correspondence between the head module 20 and the controller 30 for every light-emitting device 10. In contrast, in the embodiment of FIG. 1, the storage device 26 is provided together with the light-emitting unit 22 in the head module 20. Therefore, even when the characteristics of the individual light-emitting elements E are different from one another for every light-emitting device 10, all the light-emitting devices 10 can use the same controller 30. In other words, with the construction shown in FIG. 1, it is unnecessary to manage the correspondence between the head module 20 and the controller 30, which simplifies the process of manufacturing the light-emitting device 10.

Second Modification

In the above-mentioned embodiment and the first modification, the controller 30 sets the pulse width T[j] and the current value I[j] according to the correction coefficients (Ka[j] and Kb[j]). However, at least one of the pulse width T[j] and the current value I[j] may be set by the head module 20. For example, the pulse width T[j] according to th-e correction coefficient Ka[j] is computed by the controller 30, and the current value I[j] according to the correction coefficient Kb[j] is determined by the head module 20. However, in the invention, it is not indispensable to separately configure the head module 20 and the controller 30. For example, a circuit having the same effects and functions as the controller shown in FIG. 1 may be provided in the head module 20.

Third Modification

The method of setting the pulse width T[j] on the basis of the correction coefficient Ka[j] and the method of setting the current value I[j] on the basis of the correction coefficient Kb[j] are not limited to the above-mentioned embodiments and modifications. In the above-mentioned embodiments and modifications, the pulse width T[j] is computed by multiplying the grayscale value of the grayscale data Dg by the correction coefficient Ka[j]. However, the pulse width T[j] may be computed by other computations. Further, in the above-mentioned embodiments and modifications, the correction coefficient Ka[j] of Equation 8a is stored in the storage device 20. However, the pulse width T[j] of Equation 7a may be stored in the storage device 26. In this construction, the pulse width determining unit 35 determines the pulse width T[j] of the driving signal Xj by adjusting the pulse width Tb[j] read from the storage device 26 on the basis of the grayscale data Dg. Furthermore, the peak light amount Pb[j] of Equation 7b may be stored in the storage device 26. In this construction, the current value determining unit 37 computes the current value T[j] for making the light-emitting element E emit light in the peak light amount Pb[j] read from the storage device 26 and sets the current value I[j] to the corresponding unit circuit U.

Electronic apparatuses
Image forming apparatus

Next, an image forming apparatus, which is an aspect of electronic apparatuses according to the Invention, will be described with reference to FIG. 6. The image forming apparatus is a tandem full-color image forming device of a belt Intermediate transfer type.

In the image forming apparatus, four light-emitting devices 10K, 10C, 10M, and 10Y having the same construction are arranged to face image forming surfaces 110A of four photoconductor drums (image carriers) 110K, 110C, 110M, and 110Y having the same construction, respectively. Each of the light-emitting devices 10K, 10C, 10M, and 10Y is the light-emitting device 10 according to any one of the above-mentioned embodiments and modifications.

Figure 6:
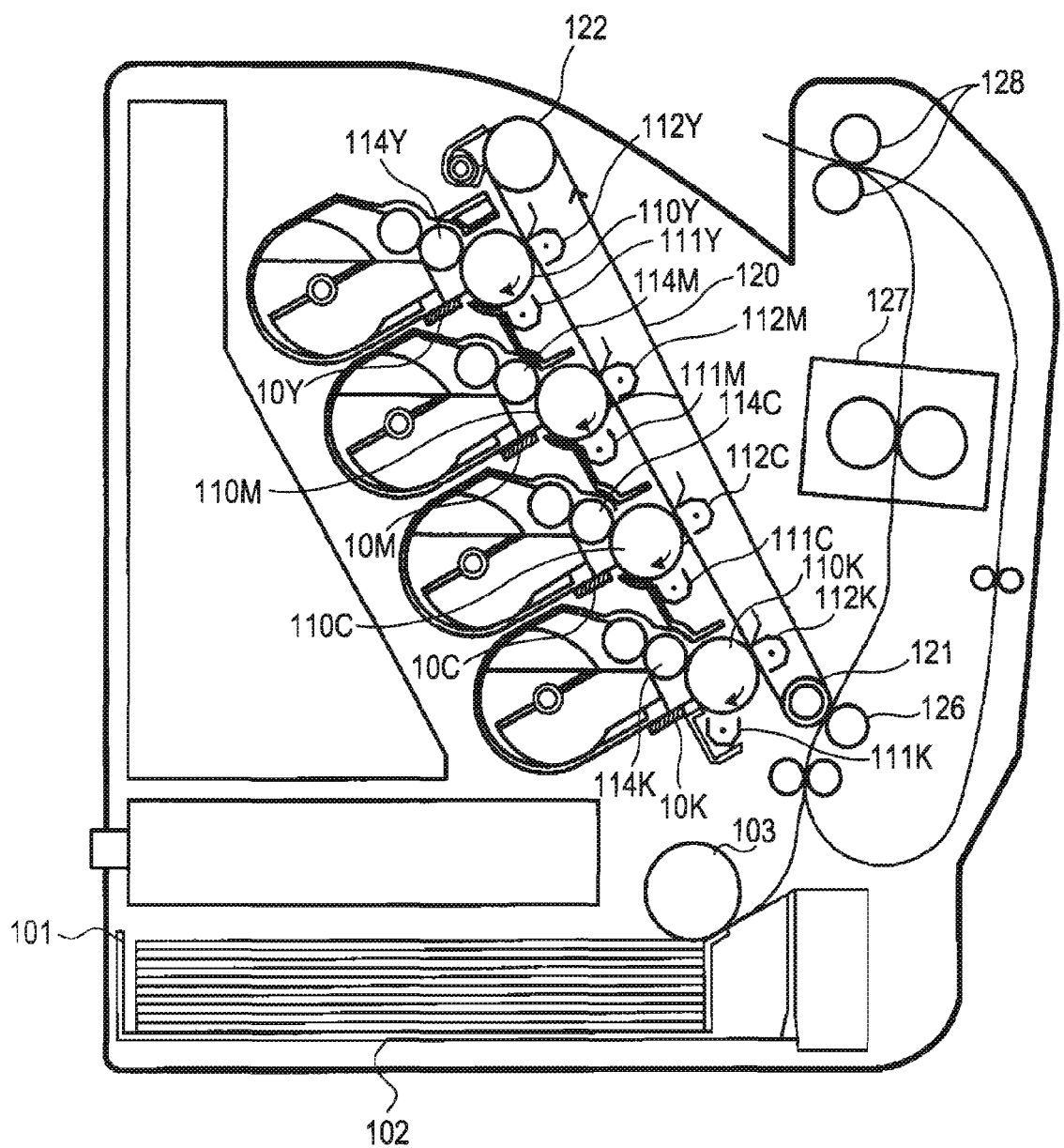
FIG. 6 is a perspective view showing a specific example (image forming apparatus) of an electronic apparatus according to the invention.

As shown in FIG. 6, the image forming apparatus has a driving roller 121 and a follower roller 122. An endless intermediate transfer belt 120 is wound around these rollers 121 and 122 so as to be rotate around the rollers 121 and 122 as indicated by arrow. Although not shown, the image forming apparatus may have a tension applying member, such as a tension roller, that applies tension to the intermediate transfer belt 120.

The four photoconductor drums 110K, 110C, 110M, and 110Y each having a photosensitive layer on its outer peripheral surface are arranged at predetermined intervals around the intermediate transfer belt 120. The suffixes 'K', 'C', 'M', and 'Y' means that the photoconductor drums are used for forming a toner image in black, cyan, magenta, and yellow, respectively. This is similarly applied to other members. The photoconductor drums 110K, 110C, 110M, and 110Y are driven to rotate in synchronization with the driving of the intermediate transfer belt 120.

A corona charging device 111 (K, C, M, and Y), the light-emitting device 10 (K, C, M, and Y), and a developing device 114 (K, C, M, and Y) are arranged around each photoconductor drum 110 (K, C, N, and Y). The corona charging device 111 (K, C, M, and Y) uniformly charges the image forming surface 110A (outer peripheral surface) of the corresponding photoconductor drum 110 (K, C, M, and Y). The light-emitting device 10 (K, C, M, and Y) writes an electrostatic latent image on the charged image forming surface 111A of the photoconductor drum. In each light-emitting device 10 (K, C, M, or Y), a plurality of light-emitting elements E are arranged along the generatrix (main scanning direction) of each photoconductor drum 110 (K, C, M, or Y). The writing of an electrostatic latent image is performed by irradiating the photoconductor drum 110 (K, C, M, or Y) with light from the plurality of light-emitting elements E. The developing device 114 (K, C, M, and Y) deposits toner as a developer on the electrostatic latent image so that a toner image (i.e., a visible image) is formed on the corresponding photoconductor drum.

The respective toner images of black, cyan, magenta, and yellow formed by such four single-color toner image forming stations are primarily transferred sequentially onto the intermediate transfer belt 120 so as to be superposed on the intermediate transfer belt 120. As a result, a full-color toner image is obtained. Four primary transfer corotrons (transferring devices) 112 (K, C, M and Y) are arranged inside the intermediate transfer belt 120. The primary transfer corotrons 112 (K, C, M, and Y) are arranged in the vicinities of the photoconductor drums 110 (K, C, M, and Y), respectively, and electrostatically attract toner images from the photoconductor drums 110 (K, C, M, and Y) to transfer the toner images to the intermediate transfer belt 120 passing between the photoconductor drums and the primary transfer corotrons.

A sheet 102, which is a target (recording medium) on which an image is to be finally formed, is fed one by one from a sheet feed cassette 101 by a pickup roller 103, and is then sent to a nip between the intermediate transfer belt 120 abutting on the driving roller 121 and a secondary transfer roller 126. The full-color toner image on the intermediate transfer roller 120 is secondary transferred onto one surface of the sheet 102 all at once by the secondary transfer roller 126, and then passes between a pair of fixing rollers 127, serving as a fixing unit, so as to be fixed on the sheet 102. Thereafter, the sheet 102 is discharged onto a sheet discharge cassette formed on the top of the image forming apparatus, by a pair of sheet discharge rollers 128.

Figure 7:
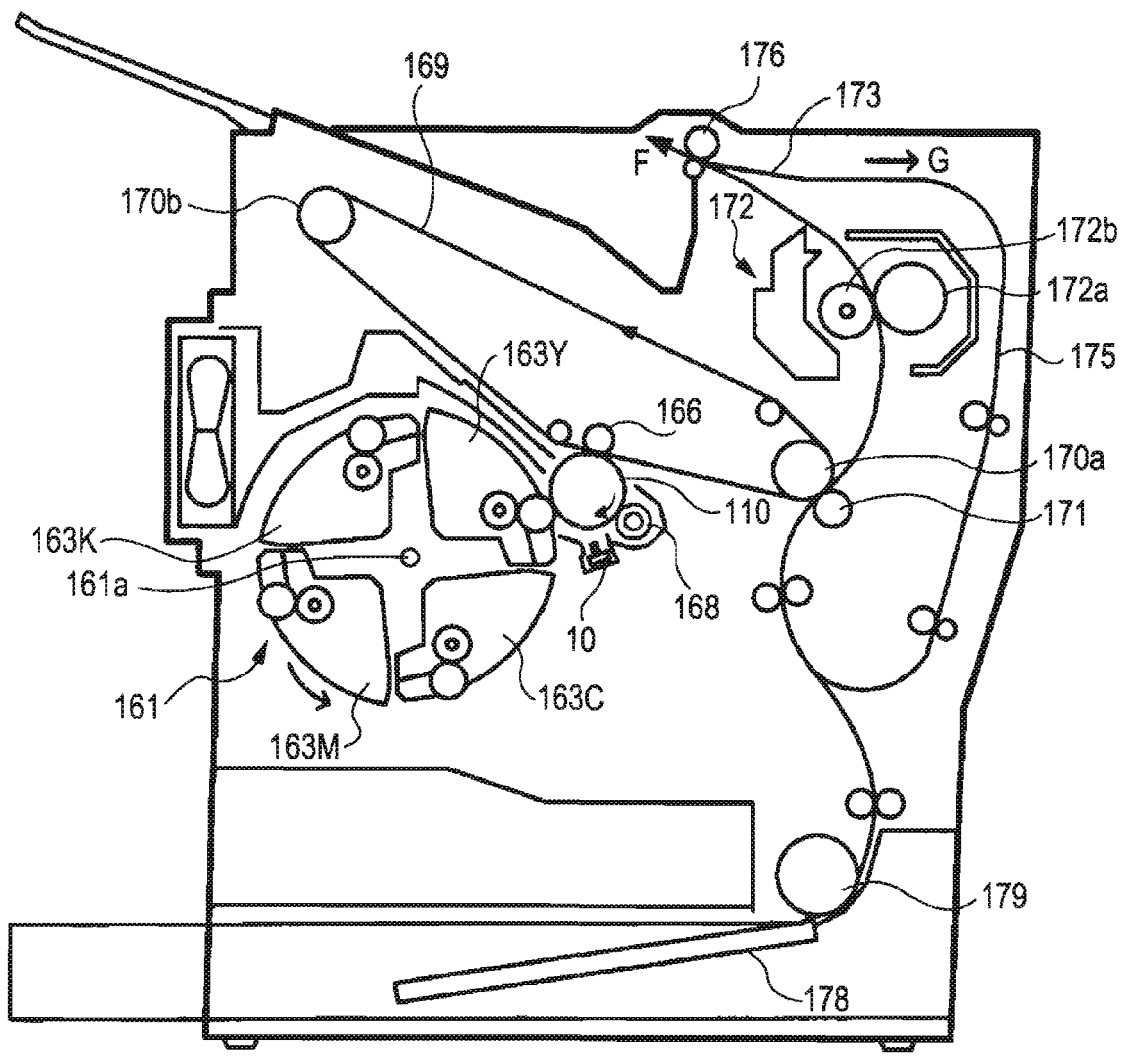
FIG. 7 is a perspective view showing another specific example (image forming apparatus) of the electronic apparatus according to the invention.
Figure 8:
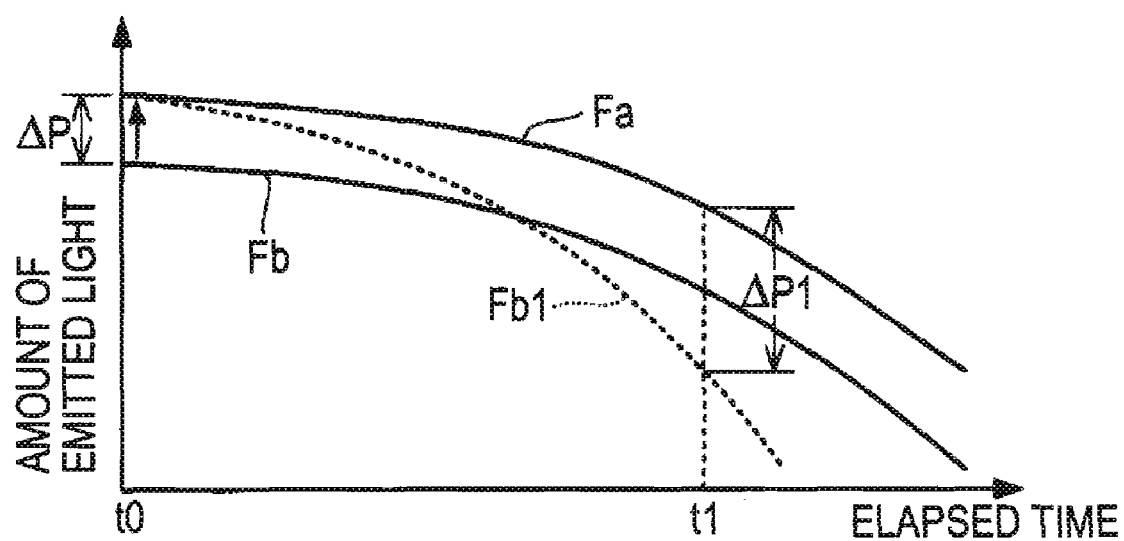
FIG. 8 is a graph for explaining the drawbacks in the related art.

Next, another image forming device according to the invention will be described with reference to FIG. 7. This image forming device is a rotary-development-type full-color image forming apparatus using a belt intermediate transfer body method. As shown in FIG. 7, a corona charging device 168, a rotary developing unit 161, the light-emitting device 10 according to any one of the above-mentioned embodiments and modifications, and an intermediate transfer belt 169 are provided around a photoconductor drum 110.

The corona charging device 168 uniformly charges an outer peripheral surface of the photoconductor drum 110. The light-emitting device 10 writes an electrostatic latent image on the charged image forming surface 110A (outer peripheral surface) of the photosensitive drum 110. In the light-emitting device 10, a plurality of light-emitting elements E are arranged along the generatrix (main scanning direction) of the photoconductor drum 110. The writing of an electrostatic latent image is performed by irradiating the photosensitive drum 110 with light from the plurality of light-emitting elements E.

The developing unit 161 is a drum in which four developing devices 163Y, 163C, 163M, and 163K are arranged at angular intervals of 90 degrees, and is rotatable around a shaft 161a in the counterclockwise direction. The developing devices 163Y, 163C, 163M, and 163K supply yellow, cyan, magenta, and black toners to the photoconductor drum 110, respectively, to deposit the toners as a developer on an electrostatic latent image so that toner images (i.e., visible images) are formed on the photosensitive drum 110.

The endless intermediate transfer belt 169 is wound around a driving roller 170a, a follower roller 170b, a primary transfer roller 166, and a tension roller so as to rotate around these rollers in a direction as indicated by arrow. The primary transfer roller 166 electrostatically attract the toner images from the photoconductor drum 110 and transfers the toner images onto the intermediate transfer belt 169 passing between this photoconductor drum 110 and the primary transfer roller 166.

More specifically, during the first one turn of the photoconductor drum 110, an electrostatic latent image for a yellow (Y) image is written by the light-emitting device 10, a yellow toner image is then formed by the developing device 163Y, and the yellow toner image is then transferred to the intermediate transfer belt 169. During the next one turn of the photoconductor drum 110, an electrostatic latent image for a cyan (C) image is written by the light-emitting device 10, a cyan toner image is then formed by the developing device 163C, and the cyan toner image is then transferred to the intermediate transfer belt 169 so as to be superposed on the yellow toner image. While the photoconductor drum 165 makes four turns in this way, toner images with yellow, cyan, magenta, and black are sequentially superposed on the intermediate transfer belt 169. As a result, a full-color toner image is formed on the intermediate transfer belt 169. When images are formed on both sides of a sheet, that is, a target on which the image is to be finally formed, full-color toner images are respectively formed on the surface and the reverse of the intermediate transfer belt 169 in such a manner that toner images with the same color are transferred to the surface and the reverse of the intermediate transfer belt 169, and then toner imaged with the next same color are transferred to the surface and the reverse of the intermediate transfer belt 169.

In the image forming apparatus, a sheet conveying path 174 is formed for allowing a sheet to pass therethrough. A sheet is withdrawn one by one by a pickup roller 179 from a sheet feed cassette 178, is advanced by a conveying roller along the sheet conveying path 174, and passes through a nip between the intermediate transfer belt 169 abutting the driving roller 170a and the secondary transfer roller 171. The secondary transfer roller 171 electrostatically attract a full-color toner image from the intermediate transfer belt 169 all at once to transfer the toner image onto one surface of the sheet. The secondary transfer roller 171 is configured to approach and be separated from the intermediate transfer belt 169 by a clutch (not shown). While the full-color image is transferred onto the sheet, the secondary transfer roller 171 is brought into contact with the intermediate transfer belt 169, and while toner images are superposed on the intermediate transfer belt 169, the secondary transfer roller 171 is separated from the intermediate transfer roller 169.

The sheet having the toner images transferred thereto in the above manner is conveyed to the fixing unit 172, and then passes between a heating roller 172a and a pressure roller 172b of the fixing unit 172, such that the toner images on the sheet is fixed. The sheet after the fixing treatment is drawn into a pair of sheet discharge rollers 176 to advance in the direction indicated by an arrow F. In a case of double-sided printing, after most of a sheet has past between the pair of sheet discharge rollers 176, the pair of sheet discharge rollers 176 is rotated in a reverse direction so that the sheet is introduced into a conveying path 175 for double-sided printing, as indicated by an arrow G. Then, the toner images are transferred to the other surface of the sheet by the secondary transfer roller 171. Subsequently, the sheet is subjected to a fixing treatment by the fixing unit 172 again, and is then discharged by the pair of sheet discharge rollers 176.

Since each of the image forming apparatuses shown in FIGS. 6 and 7 utilizes a light source (exposing unit) using OLED elements as the light-emitting elements E, it is possible to reduce the size of the image forming apparatus compared to a case in which a laser scan optical system is utilized. Further, the light-emitting device according to the invention can also be applied to electrophotographic image forming apparatuses in addition to the exemplified image forming apparatuses. For example, the light-emitting device according to the invention can also be applied to an image forming apparatus of a type in which a toner image is directly transferred onto a sheet from a photoconductor drum without using an intermediate transfer belt, and to an image forming apparatus that forms a monochrome image.

OTHERS

The light-emitting devices used for exposing heads have been exemplified above, but the usage of the light-emitting devices according to the invention is not limited thereto. For example, any one of the light-emitting devices according to the invention can be used in image readers, such as scanners, as a line-type optical head (illuminating device) for irradiating an object, such as a script, to be read with light. The image readers includes a scanner, a reading unit of a copying machine, a reading unit of a facsimile, a bar code reader, and a two-dimensional image code reader that reads two-dimensional bar codes, such as QR codes (registered trademark). Further, the light-emitting device having a plurality of light-emitting elements arranged thereon can be used as a backlight unit disposed on the rear surface side of a liquid crystal panel.

Furthermore, the light-emitting device according to the invention can be used as an image display device. In the image display device, the plurality of light-emitting elements are arranged in a matrix. A scanning line driving circuit selects a row of light-emitting elements E in every unit period (horizontally scanning period) and the light-emitting elements E in the selected row are supplied with the driving signals Xj from the driving circuit 24. In this construction, the current values I[j] set to the current value generating units of the individual unit circuits U are sequentially updated according to the current value data Di supplied from the current value determining unit 37 in every horizontally scanning period. With this construction, the same effects as those of the above-mentioned embodiments and modifications can be obtained.

Electronic apparatuses, in which the light-emitting device according to the invention can be used for image display, include a notebook personal computer, a cellular phone, a personal digital assistant (PDA), a digital still camera, a television set, a video camera, a car navigator, a pager, an electronic organizer, an electronic paper, an electronic calculator, a word processor, a workstation, a video phone, a POS terminal, a printer, a scanner, a copier, a video player, and apparatuses having touch panels.

The entire disclosure of Japanese Patent Application No. 2005-318023, filed Nov. 1, 2005 is expressly incorporated by reference herein.

What is claimed is:
1. A light-emitting device comprising:
a plurality of light-emitting elements whose luminous energy is controlled according to a current value and a pulse width of a driving signal;
a storage unit that stores first and second coefficients for every light-emitting element;
a pulse width determining unit that determines the pulse width of the driving signal supplied to each light-emitting element on the basis of the first coefficient for the corresponding light-emitting element stored in the storage unit and a grayscale value designated for the corresponding light-emitting element by grayscale data;
a current value determining unit that determines a current value of the driving signal supplied to each light-emitting element on the basis of the second coefficient for the corresponding light-emitting element stored in the storage unit;
a driving unit that supplies the driving signal having the current value determined by the current value determin- ing unit within the pulse width determined by the pulse width determining unit to the corresponding light-emitting element; and a coefficient determining unit that calculates the first coefficient based on a target value of a light amount of any of the light-emitting elements and a first peak light amount of one of the light-emitting elements, and calculates the second coefficient based on a second peak light amount of one of the light-emitting elements and a luminous efficiency constant, wherein a variation in the light emission characteristic of each light-emitting element when the pulse width is changed and the current value of the driving signal is fixed is different from a variation in the light emission characteristic thereof when the current value is changed and the pulse width of the driving signal is fixed, the first and second coefficients stored in the storage unit are selected so that the luminous energy of the individual light-emitting elements when the same grayscale value is designated by the grayscale data are almost equal to one another and variations in the light emission characteristics of the plurality of light-emitting elements driven by the driving signals from the driving unit are substantially equal to one another, the pulse width determining unit determines the pulse width of the driving signal by multiplying the grayscale value designated by the grayscale data by the first coefficient stored in the storage unit, and when the driving signal having the current value determined such that the peak light amount of any one of the light-emitting elements becomes a target value P0 is supplied and one light-emitting element emits light in a peak light amount Pa, the first coefficient Ka for the one light-emitting element stored in the storage unit satisfies the following expression:

$$Ka = (P0/Pa)^{m/(m-1)}$$

(where m is a real number).

2. The light-emitting device according to claim 1, wherein a speed at which the peak light amount of each light-emitting element decreases over time when a predetermined grayscale value is designated is in proportion to the m-th power (m is a real number) of the current value of the corresponding driving signal, and the first and second coefficients stored in the storage unit are selected so that decreasing speeds of the peak light amounts of the plurality of light-emitting elements when the predetermined grayscale value is designated are equal to one another.

3. The light-emitting device according to claim 1, wherein, when the driving signal having the current value and the pulse width determined such that the peak light amount of any one of the light-emitting elements becomes a target value P0 is supplied and one light-emitting element emits light in a peak light amount Pa, the current value determining unit determines the current value of the driving signal supplied to the one light-emitting element on the basis of the first coefficient so that a peak light amount Pb of the one light-emitting element satisfies the following:

$$Pb = P0 \times (P0/Pa)^{-m/(m-1)}$$

(where m is a real number).

4. An electronic apparatus comprising the light-emitting device according to claim 1.

5. A driving circuit of a light-emitting device which includes a plurality of light-emitting elements whose light emission amount is controlled according to a current value and a pulse width of a driving signal and in each of which a variation in the light emission characteristic when the pulse width is changed and the current value of the driving signal is fixed is different from a variation in the light emission characteristic when the current value is changed and the pulse width of the driving signal is fixed, comprising:

a storage unit that stores first and second coefficients for every light-emitting element;

a pulse width determining unit that determines the pulse width of the driving signal supplied to each light-emitting element on the basis of the first coefficient for the corresponding light-emitting element stored in the storage unit and a grayscale value designated by grayscale data for the corresponding light-emitting element;

a current value determining unit that determines the current value of the driving signal supplied to each light-emitting element on the basis of the second coefficient for the corresponding light-emitting element stored in the storage unit;

a driving unit that supplies the driving signal having the current value determined by the current value determining unit within the pulse width determined by the pulse width determining unit to the corresponding light-emitting element; and a coefficient determining unit that calculates the first coefficient based on a target value of a light amount of any of the light-emitting elements and a first peak light amount of one of the light-emitting elements, and calculates the second coefficient based on a second peak light amount of one of the light-emitting elements and a luminous efficiency constant, wherein the first and second coefficients stored in the storage unit are selected so that the peak light amounts of the individual light-emitting elements when the same grayscale value is designated by the grayscale data are almost equal to one another and variations in the light emission characteristics of the plurality of light-emitting elements driven by the driving signals from the driving unit are substantially equal to one another, the pulse width determining unit determines the pulse width of the driving signal by multiplying the grayscale value designated by the grayscale data by the first coefficient stored in the storage unit, and when the driving signal having the current value determined such that the peak light amount of any one of the light-emitting elements becomes a target value P0 is supplied and one light-emitting element emits light in a peak light amount Pa, the first coefficient Ka for the one light-emitting element stored in the storage unit satisfies the following expression:

$$Ka = (P0/Pa)^{m/(m-1)}$$

(where m is a real number).

6. A method of driving a light-emitting device which includes a plurality of light-emitting elements whose luminous energy is controlled according to a current value and a pulse width of a driving signal and in each of which a variation in the light emission characteristic when the pulse width is changed and the current value of the driving signal is fixed is different from a variation in the light emission characteristic when the current value is changed and the pulse width of the driving signal is fixed, comprising:

determining the pulse width of the driving signal supplied to each light-emitting element on the basis of the first coefficient set for the corresponding light-emitting element and a grayscale value designated by grayscale data for the corresponding light-emitting element;

determining the current value of the driving signal supplied to each light-emitting element on the basis of the second coefficient set for the corresponding light-emitting element;

supplying the driving signal having the current value determined on the basis of the second coefficient within the pulse width determined on the basis of the first coefficient to the corresponding light-emitting element;

setting the first and second coefficients so that the peak light amounts of the individual light-emitting elements when the same grayscale value is designated by the grayscale data are almost equal to one another and variations in the light emission characteristics of the plurality of light-emitting elements driven by the driving signals are substantially equal to one another;

calculating the first coefficient based on a target value of a light amount of any of the light-emitting elements and a first peak light amount of one of the light-emitting elements; and calculating the second coefficient based on a second peak light amount of one of the light-emitting elements and a luminous efficiency constant.

* * * * *